Feb. 7, 1967      T. F. ZLOTEK      3,302,761

SPRAG LOCK RETAINER ASSEMBLY

Filed Jan. 25, 1965

INVENTOR.
THADDEUS F. ZLOTEK
BY Whittemore, Hulbert
Belknap
ATTORNEYS

United States Patent Office 3,302,761
Patented Feb. 7, 1967

3,302,761
SPRAG LOCK RETAINER ASSEMBLY
Thaddeus F. Zlotek, Center Line, Mich., assignor to Formsprag Company, Warren, Mich., a corporation of Michigan
Filed Jan. 25, 1965, Ser. No. 427,802
10 Claims. (Cl. 192—45.1)

The present invention relates to improvements in an overrunning clutch assembly of sprags and retainer means for the latter, whereby the sprags, as arranged in an annular array and spaced circumferentially very slightly from one another by the retainer, are prevented from excessively rolling over, or kicking free, from a normal continuous wedging or sliding engagement with one of two concentric clutch races between which they and the retainer are disposed. In these respects, the present invention involves improvements over overrunning clutch assemblies such as are the subject matter of my U.S. Letters Patent No. 3,049,206, of August 14, 1962, and U.S. Letters Patent to Lund No. 3,075,623, of January 29, 1963.

Typical situations dealt with by the improvement arise when one or more of the clutch sprays tend to roll over fully or beyond a permissible limit, on a driver race under a momentary torque overload during an otherwise continuous drive through the sprags from one race to the other, or to kick free of the driver race, upon which they should normally slide in overrun. The effects may be the result of a slight torsional fluctuation in the system, or a definite instantaneous shift of the races relative to one another upon pickup or release of a load. The cause may be a reaction to high frequency vibratory effects arising in the operation of the clutch in some installations.

For example, upon a sudden and heavy load pickup or a momentary substantial increase of torque, yet well within the normal torque capacity of the sprag set as a whole, one or a few of the sprags may roll over completely on its driver race wedging surface in the direction opposed to driving torque; and in such an event the driving race slides past the sprag or sprags in question. This renders it or them useless thereafter, and is quite likely to kink or sever the usual biasing garter spring means of the clutch and/or to damage the driven race. The clutch is in effect inoperative.

The same, but opposite, reaction to a sudden load release, or due to high frequency vibration in some phase of the operation, may cause one or more of the sprags to be instantaneously shifted in the opposite direction, so as to kick free of a clutch driver race they normally engage under the bias of the garter springs, again tending to damage or break the latter. This objection typically occurs in an aircraft installation upon a rapid decrease of the driven load. As the sprags tend to release and unwind on the driving race, the rate at which they do so may be so great as to cause the sprags to be inertially shot or kicked violently entirely out of engagement with the driving race.

It is therefore a general object of the present invention to eliminate the possibility of damage or inoperativeness arising from either of the phenomena mentioned in the preceding paragraphs, yet without involving exacting considerations as to the precise design of the sprags, per se, nor of the sprags in relation to other race, retainer and spring components of the clutch.

More specifically, it is an object of the invention to provide an arrangement of clutch sprags for coaction with retainer and bias springs for the purpose in question, in which the provisions for preventing the mentioned sprag roll-over and kick-off are in their entirety built into the sprags themselves. Thus, each sprag of a closely spaced circumferential set of identical sprags is provided with first and second integral projecting formations upon its respective leading and trailing sides which automatically make impossible the deleterious effects referred to.

The first of these formations is built onto the side of the sprag body which faces circumferentially in the direction of torque transmission, and it is directly engageable, in the event of a tendency to roll over, with the oppositely facing, second formation on the sprag just forward thereof in the rotative direction. Since the sprags are very closely positioned circumferentially relatively one to the other, in a minimal spacing approximating that of a non-caged or full complement sprag set (or approximating that shown in the Lund patent identified above), the result is that each sprag prevents forward roll-over of the sprag immediately to the rear thereof, its rearwardly facing formation blocking the forward formation of the trailing sprag. Thus the sprags can react only to a limited extent to an individual instantaneous overload on any one or more thereof. Full roll-over of any is prevented in a very simple manner.

For the purpose of preventing damaging action as the result of a momentary, opposite kick-off of a sprag upon sudden release or diminution of load, each sprag has its second formation, i.e., that on its trailing side which limits roll-over of the sprag to its rear, further shaped for direct, radially outward engagement with the annular retainer of the clutch. This receives kick-off of the sprag, preventing it from becoming sufficiently pronounced to cause distortion, kinking or breaking of the sprag biasing garter spring means. The sprag in question may also contact the adjacent sprag to the rear to assist in the control of this action.

Thus it is seen that the invention, as directed to a sprag and retainer assembly, essentially involves bi-functional improvements in the design of the sprags, per se, the retainer coacting with the features of the sprag in disciplining the latter as to roll-over and kick-off.

The foregoing as well as other objects will become more apparent as this description proceeds, especially when considered in connection with the accompanying drawing illustrating the invention, wherein.

Figure 1:
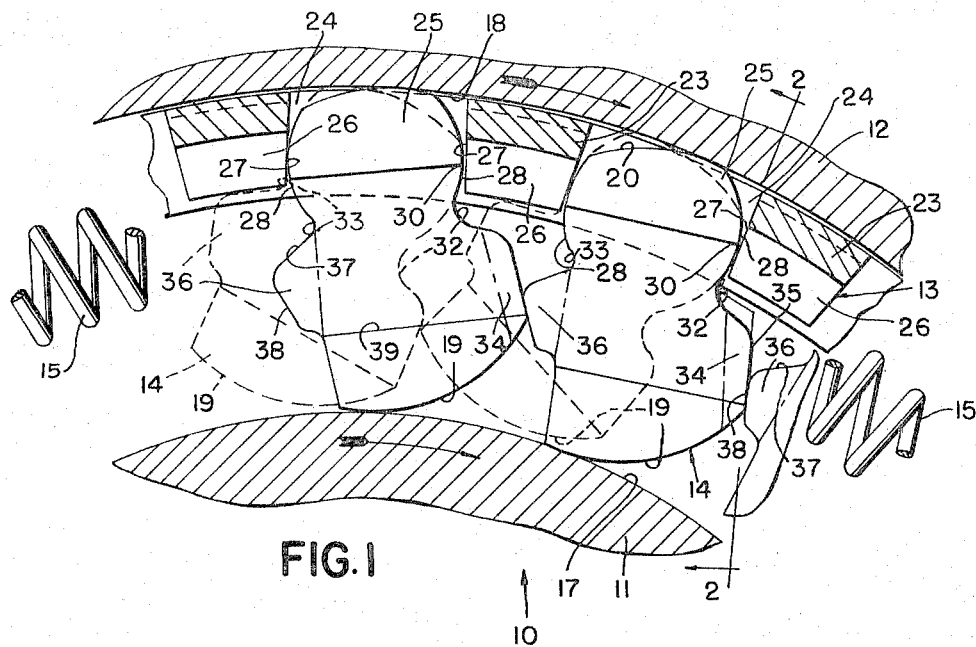
FIG. 1 is a large scale, fragmentary view, in transverse radial section on line 1—1 of FIG. 2, of an assembly of clutch race, sprag, retainer and spring components in accordance with the invention, this view showing in solid and dotted lines, respectively, the positions of the sprags as limited at extreme positions to prevent full roll-over and excessive kick-off action.

The improvements of the invention are shown as being embodied in an overrunning type sprag clutch, generally designated 10, characterized in common with such clutches by an inner race member 11, which may be assumed to be a driver rotating in the direction indicated by arrow; a concentric outer driven race member 12 operating in both the torque transmitting and overrunning phases of clutch operation in the direction indicated by arrow; a sprag retainer 13 similar to that illustrated and described in the above identified Zlotek patent; a series of identical sprags 14 operating in an annular space between races 11 and 12, in which sprags are in a quite closely spaced circumferential order, approximating the spacing of a full sprag complement, or as illustrated in the Lund patent; and a pair of parallel annular, coiled garter springs 15.

The inner race 11 affords a cylindrical driving race surface 17, the outer race member 12 has a cylindrical driven race surface 18 concentric with surface 17, and these respective surfaces are adapted to be releasably engaged wedgingly in the driving phases of operation by the usual convexly arcuate and radially opposed wedging or cam surfaces 19, 20 of the sprags 14. Of course, the outer race member 12 may be the driver and the inner race member 11 the driven in some instances. In all such respects the clutch 10 is conventional.

Figure 2:
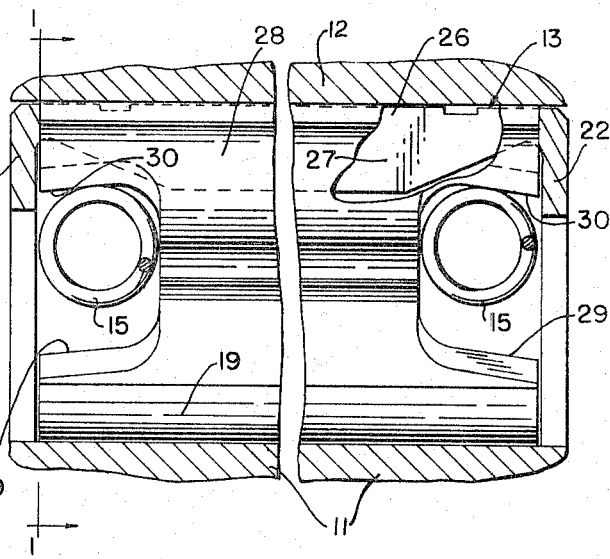
FIG. 2 is a fragmentary view, partially broken away and in section on broken line 2—2 of FIG. 1, further illustrating the relation of the sprags to races, retainer and biasing springs.

Retainer 13, as illustrated best in FIGS. 1 and 2, is in the form of a one-piece annular part including a pair of parallel and axially spaced end rings 22 integrally connected by sprag separating cross pieces or bars 23, which define circumferentially spaced openings 24 in which the outer ends of the sprags are received for guiding and restraining action.

As suggested in the Zlotek patent, the cross bars 13 are radially inwardly thickened at 26 to afford side surfaces 27 against which the sprag outer ends 25 may rollingly bear; and these sprag ends are shaped to provide side bearing surfaces 28 in the form of circle segments adapted to roll against cross bar surfaces 27 in the usual tilting of the sprag 14 in operation.

Referring to FIG. 2, each sprag is formed to provide, at each of the axial ends thereof, a through notch or recess 29 in which the biasing or energizing garter springs 15 are received. These notches are inclined so as to provide at the upper end thereof facing the direction of rotation (arrows in FIG. 1), a transverse corner or edge 30 against which the springs 15 bear expansively and radially outwardly. Thus, each sprag 14 is spring biased to tilt the same in a counterclockwise direction, as viewed in FIGS. 1 and 3, thus urging the radially inner sprag surface 19 against the inner race surface 17 and the outer sprag wedging surface 20 against the outer race surface 18.

Figure 3:
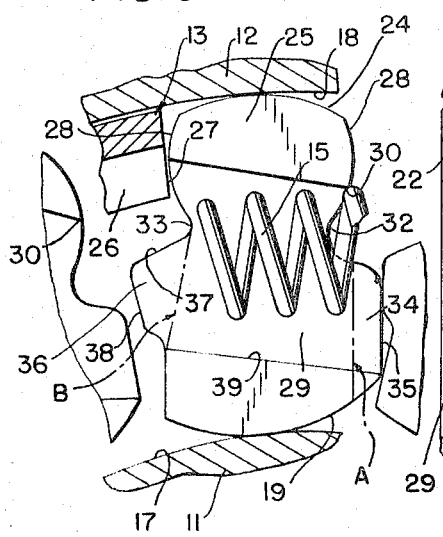
FIG. 3 is a fragmentary view in section similar to FIG. 1, but showing the sprags in an approximate position for normal torque transmission, from which they shift but slightly in normal overrun.

Theoretically and normally, the sprags 14 are thus engaged wedgingly and fixedly between the races 11 and 12 during the torque transmitting phase of clutch operation (clockwise in FIGS. 1 and 3), and in a position such as that of FIG. 3 from which they may readily release at the instant of overrun of the driven race 12; while during overrun of the outer race 12, the sprags will slide over the inner, driver race surface 17, with the sprag surfaces 19 in continuous engagement with race surface 17. However, this theoretical continued engagement does not actually and always prevail during the instantaneous torque change-overs or high frequency vibratory phases discussed above, the possible damaging effects of which the improvement of the invention is intended to neutralize by a simple and effective improvement in the sectional outline of the sprag 14.

In a general way, the sprags 14 have a cross section, in a transverse plane at 90° to the axis of clutch 10 which resembles that of my Patent 3,049,206, characterized by a restricted waist portion defined between the opposite concavities 32 and 33 in its respective leading and trailing sides, from which waist portion the remainder of the sprag extends to its radially inner wedging surface 19. However, in accordance with the principle of the present invention, there is added to the circumferentially leading side of each sprag 14 an integral, forwardly projecting formation or nose extension 34, represented by the portion of the sprag body to the right of the dot-dash reference line A, as viewed in FIG. 3, and up to a transverse contact surface 35. This formation extends in a generally radial direction from the waist cavity or bay 32 to the inner wedging surface 19 of the sprag, and represents a forward continuation of the sprag body which is of substantial circumferential extent. It also extends throughout the axial dimension of the sprag and is of substantial height in the radial sense. Surface 35 constitutes an abutment or contact surface effective in the limiting control of sprag roll-over as will be further described.

The opposite, circumferentially rearwardly facing side of the sprag 14 is provided, to the left of the theoretical dot-dash line in FIG. 3, with its own integral, rearwardly facing formation or extension 36. This is in the form of a solid tail portion in an outline extending angularly at an outer surface 37 from the rearward waist concavity or bay 33, thence along a generally radial surface at 38 to a point approximately in the plane of the lower or radially inner wall 39 of the sprag's spring receiving notch or recess 29. The tail formation 36 is, like the formation 34, of substantial radial, circumferential and axial extent. Its trailing surface 38 is adapted to coact with the nose surface 35 of the next rearward sprag in controlling rollover; and its surface 37 is adapted to coact with the sprag retainer 13 in limiting kick-off.

Thus, in operation the sprag 14 will normally occupy positions very approximate that shown in FIG. 3 of the drawing when the clutch 10 is in both its driving or its overrunning phase, tilting but slightly from this position in going into and out of clutch action. However, referring now to FIG. 1, in the event of a sudden and relatively severe shock engagement, whether in going into a full drive condition or under high frequency vibratory action, the sprags 14 will, as shown in solid line, tend to tilt and roll over further counterclockwise in their engagement with the driver race 11. Should this action be permitted to go on uncontrolled, one or more sprags would roll fully over and become thereafter inoperative, with the race surface 17 simply passing beneath the same, and with likely damage to the garter springs 15, the retainer 13, the driven race or all, as mentioned above.

However, when the sprags 14 reach a critical limit position, the proportions of the forward nose extension 34 and the rearward tail extension 36 are such that the respective surfaces 35 and 38 of these portions come into abutting engagement with one another (solid line in FIG. 1) and further tilt in a roll-over direction is blocked by the chain of sprags. Upon termination of the excessive local torque, the sprag 14 will resume the normal driving position of FIG. 3, and upon overrunning will cease driving engagement with inner race surface 17 though remaining in sliding contact with the latter.

On the other hand, should a clutch throw-out impulse take place of a sufficient intensity to kick a sprag or sprags 14 to the rear (clockwise in FIGS. 1 and 3) the wedging surfaces 19 of these sprags may well depart from engagement with the inner race surface 17, as depicted in dotted line in FIG. 1. Notwithstanding this, the clockwise throw will in each case be limited to such sufficient only to engage the surface 37 of the trailing formation 36 of the sprag with the intermediate, radially thickened portion 27 of the adjacent cross bar 26 of retainer 13. Hence no permanent kinking or breaking of the biasing springs 15 can occur; and the springs will of course immediately return the sprags to their normal position of FIG. 3.

It is seen from the above that the invention provides, in an extremely simple and inexpensive manner, and without reliance upon critical dimensioning of sprag and other components, an arrangement to discipline all of the sprags 14 against undesirable actions which, though not characteristic of all possible installations, are apt to have very damaging effects in others.

What I claim as my invention is:

1. A clutch sprag for assembly with a retainer and other identical sprags of a circumferentially compact annular series between races of an overrunning clutch, said sprag having radially opposite ends provided with surfaces for releasable driving action between and on said races, said sprag having first and second formations of substantial size projecting respectively from leading and trailing circumferential sides of the sprag, in respect to the driving direction of the clutch, the first formation of said sprag being engageable with the second formation of a preceding sprag to limit tilt in a driving phase of said releasable driving action, the second formation of the first named sprag being engageable with the retainer in a release phase of said action to limit movement of said first named sprag away from a race drivingly engaged thereby in said driving phase.

2. A clutch sprag for assembly with a retainer and other identical sprags of a circumferentially compact annular series between races of an overrunning clutch, said sprag having radially opposite ends provided with surfaces for releasable driving action between and on said races, said sprag having first and second formations of substantial size projecting respectively adjacent a wedging end thereof from leading and trailing circumferential sides of the sprag, in respect to the driving direction of the clutch, the first formation of said sprag being engageable with the second formation of a preceding sprag to limit tilt in a driving phase of said releasable driving action, the second formation of the first named sprag being engageable with the retainer in a release phase of said action to limit movement of said wedging end of said first named sprag away from a race drivingly engaged thereby in said driving phase.

3. A clutch sprag for assembly with a retainer and other identical sprags of a circumferentially compact annular series between races of an overrunning clutch, said sprag having radially opposite ends provided with surfaces for releasable driving action between and on said races, said sprag having first and second formations of substantial size and different shape projecting respectively adjacent a wedging end thereof from leading and trailing circumferential sides of the sprag, in respect to the driving direction of the clutch, the first formation of said sprag being engageable with a first surface of the second formation of a preceding sprag to limit tilt in a driving phase of said releasable driving action, the second formation of the first named sprag being provided with a further surface engageable with the retainer in a release phase of said action to limit movement of said wedging end of said first named sprag away from a race drivingly engaged thereby in said driving phase.

4. A clutch sprag and retainer assembly for use between races of an overrunning clutch, comprising a circumferentially compact annular series of identical sprags each having radially opposite ends provided with surfaces for releasable driving action between and on said races, and an annular retainer by which one end of each of said sprags is received and guided for tilting movement attending said action, each sprag having first and second formations which are of substantial size and project respectively from leading and trailing circumferential sides thereof, in respect to the driving direction of a clutch embodying the assembly, the first formation of each sprag being engageable with the second formation of a preceding sprag to limit tilt in a driving phase of said releasable driving action, the second formation of each sprag being engageable with the retainer in a release phase of said action to limit movement of the sprag away from a race drivingly engaged thereby in said driving phase.

5. A clutch sprag and retainer assembly for use between races of an overrunning clutch, comprising a circumferentially compact annular series of identical sprags each having radially opposite ends provided with surfaces for releasable driving action between and on said races, and an annular retainer unit having circumferentially spaced cross elements between which one end of each of said sprags is received and guided for tilting movement attending said action, each sprag having first and second formations which are of substantial size and project respectively from leading and trailing circumferential sides thereof, in respect to the driving direction of a clutch embodying the assembly, the first formation of each sprag being engageable with the second formation of a preceding sprag to limit tilt in a driving phase of said releasable driving action, the second formation of each sprag being engageable with the retainer unit in a release phase of said action to limit movement of the sprag away from a race drivingly engaged thereby in said driving phase.

6. A clutch sprag and retainer assembly for use between races of an overrunning clutch, comprising a circumferentially compact annular series of identical sprags each having radially opposite ends provided with surfaces for releasable driving action between and on said races, and an annular retainer unit having circumferentially spaced cross elements between which one end of each of said sprags is received and guided for tilting movement attending said action, each sprag having first and second formations adjacent the other end thereof which are of substantial size and different shape and project respectively from leading and trailing circumferential sides thereof, in respect to the driving direction of a clutch embodying the assembly, the first formation of each sprag being engageable with a first surface of the second formation of a preceding sprag to limit tilt in a driving phase of said releasable driving action, the second formation of each sprag having a further surface engageable with a cross element of the retainer unit in a release phase of said action to limit movement of said other end of the sprag away from a race drivingly engaged thereby in said driving phase.

7. An assembly in accordance with claim 4, and further comprising spring means adjacent said one end of said sprags acting to bias the latter for said releasable driving action.

8. An assembly in accordance with claim 6, and further comprising coiled garter spring means adjacent said one end of said sprags acting to bias the latter for said releasable driving action.

9. A clutch sprag and retainer assembly for use between races of an overrunning clutch, comprising a circumferentially compact annular series of identical sprags each having radially opposite ends provided with surfaces for releasable driving action between and on said races, and an annular retainer unit by which one end of each of said sprags is received and guided for tilting movement attending said action, each sprag having first and second leading and trailing circumferential sides in respect to the driving direction of a clutch embodying the assembly, the first side of each sprag being engageable with the second side of a preceding sprag to limit tilt in a driving phase of said releasable driving action, the second side of each sprag being engageable with the first side of a following sprag in a release phase of said action to limit movement of the sprag away from a race drivingly engaged thereby in said driving phase, said second side being also shaped so as to be adapted to engage said retainer unit in a release phase.

10. A clutch sprag and retainer assembly for use between races of an overrunning clutch, comprising a circumferentially compact annular series of identical sprags each having radially opposite ends provided with surfaces for releasable driving action between and on said races, and an annular retainer unit by which one end of each said sprags is received and guided for tilting movement attending said action, each sprag having first and second formations which are of substantial size and project respectively from leading and trailing circumferential sides thereof, in respect to the driving direction of a clutch embodying the assembly, the first formation of each sprag being engageable with the second formation of a preceding sprag to limit tilt in a driving phase of said releasable driving action, the second formation of each sprag being engageable with the first formation of a following sprag in a release phase of said action to limit movement of the sprag away from a race drivingly engaged thereby in said driving phase, said second formation being also positioned so as to be adapted to engage said retainer unit in a release phase.

References Cited by the Examiner

UNITED STATES PATENTS

| | | | |
|---|---|---|---|
| 1,694,377 | 12/1928 | De Lavaud. | |
| 2,388,424 | 11/1945 | Lund | 192—45.1 |
| 2,973,072 | 2/1961 | Ferris | 192—45.1 |
| 3,049,206 | 8/1962 | Zlotek | 192—45.1 |

DAVID J. WILLIAMOWSKY, *Primary Examiner.*

A. T. McKEON, *Assistant Examiner.*